(12) United States Patent
Wyatt

(10) Patent No.: US 10,508,474 B2
(45) Date of Patent: Dec. 17, 2019

(54) LOCK CHARGING APPARATUS

(71) Applicant: Lashesa Wyatt, Chicago, IL (US)

(72) Inventor: Lashesa Wyatt, Chicago, IL (US)

( * ) Notice: Subject to any disclaimer, the term of this patent is extended or adjusted under 35 U.S.C. 154(b) by 0 days.

(21) Appl. No.: 16/168,119

(22) Filed: Oct. 23, 2018

(65) Prior Publication Data

US 2019/0119954 A1   Apr. 25, 2019

Related U.S. Application Data

(60) Provisional application No. 62/575,601, filed on Oct. 23, 2017.

(51) Int. Cl.
| | | |
|---|---|---|
| *H04B 1/38* | (2015.01) | |
| *E05B 67/02* | (2006.01) | |
| *H02J 7/00* | (2006.01) | |
| *H02J 7/35* | (2006.01) | |
| *H02J 7/02* | (2016.01) | |
| *E05B 67/22* | (2006.01) | |
| *E05B 17/10* | (2006.01) | |
| *E05B 67/38* | (2006.01) | |

(52) U.S. Cl.
CPC ............. *E05B 67/02* (2013.01); *E05B 17/10* (2013.01); *E05B 67/22* (2013.01); *E05B 67/38* (2013.01); *H02J 7/0054* (2013.01); *H02J 7/027* (2013.01); *H02J 7/355* (2013.01); *H02J 2007/0001* (2013.01); *H02J 2007/0062* (2013.01); *H02J 2007/0096* (2013.01)

(58) Field of Classification Search
CPC .......... E05B 67/02; E05B 17/10; E05B 67/22; E05B 67/38; H02J 7/0054; H02J 7/027; H02J 7/355; H02J 2007/0062; H02J 2007/0096
USPC ......................................................... 455/573
See application file for complete search history.

(56) References Cited

U.S. PATENT DOCUMENTS

| | | | |
|---|---|---|---|
| 2014/0117922 A1* | 5/2014 | Pham | H02J 7/0027 320/103 |
| 2015/0224268 A1* | 8/2015 | Henry | A24F 47/008 128/202.21 |

* cited by examiner

*Primary Examiner* — Huy C Ho
(74) *Attorney, Agent, or Firm* — Dale J. Ream

(57) ABSTRACT

A lock portable charging apparatus includes a case defining an interior area that is enclosed and a locking device situated in the case. A shackle assembly is operatively coupled to the locking mechanism and is functional to selectively secure the case to a support structure. The case defines a key inlet for receiving a key in to operate the lock mechanism. A battery, processor, and memory storing programming are situated in the case. A primary and auxiliary USB port are positioned on the case and electrically connected to the battery for receiving AC power to recharge the battery and share battery power with other electronic devices, respectively. A GPS module is in the case for determining a global location of the case. A solar cell is included to provide electrical current to the battery. Programming is included to locate a mobile phone associated with the case.

18 Claims, 6 Drawing Sheets

LOCK CHARGING APPARATUS

REFERENCE TO RELATED APPLICATIONS

This application claims the priority of provisional patent application U.S. Ser. No. 62/575,601 filed Oct. 23, 2017 titled Lock Charging Apparatus and which is incorporated in its entirety herein by reference.

BACKGROUND OF THE INVENTION

This invention relates generally to electronic charging devices and, more particularly, to a charging apparatus having its own locking assembly so that the charging apparatus may itself be locked to a fixture while its internal battery is being recharged, which may be electrically connected to other USB-equipped electronic devices, and which may be located using GPS technology or, conversely, used to locate an associated mobile electronics device.

Most mobile electronics operated via a battery may be recharged by interfacing a USB cable between the electronics device (i.e. a smart phone or tablet) and an electrical socket. A user simply plugs the device into an AC plug at his home, workplace, or virtually anywhere when the device's battery is running low on stored electrical power. Unfortunately, the charger is left plugged in long after the mobile electronics device has been fully charged, unplugged, and removed from the charger and charging location. The charger, then, is ripe for being stolen or used by an unauthorized person. Therefore, it would be desirable to have an electronics charging device in the form of a padlock locking device that is itself selectively locked to a support structure proximate an AC socket.

Another desirable function relative to mobile electronics is being able to locate an associated mobile phone or simply to locate a person or property carrying a token equipped to be located via an electronic signal, i.e. an electronic device locator. Further, it would be desirable to use a mobile software application running on an associated electronics device to locate the case itself (i.e. to determine a global position of the case) should the case become lost or stolen.

SUMMARY OF THE INVENTION

A lock portable charging apparatus according to the present invention includes a case defining an interior area that is enclosed and a locking device situated in the case. A shackle assembly is operatively coupled to the locking mechanism and is functional to selectively secure the case to a support structure. The case defines a key inlet for receiving a key in to operate the lock mechanism. A battery, processor, and memory configured to store programming are situated in the case. A primary and auxiliary USB port are positioned on the case and electrically connected to the battery for receiving AC power to recharge the battery and share battery power with other electronic devices, respectively. A GPS module is in the case for determining a global location of the case. A solar cell is included to provide electrical current to the battery. Programming is included to locate a mobile phone associated with the case.

The present invention introduces unique structures, functions, and characteristics not previously known or combined in the art. Namely, the present device introduces locking/unlocking options for an electronics charger with key entry, anti-theft, GPS technology and ability to communicate with other device. A software application is presented and having solar power back-up. In addition, the invention involves mobile communication, mobility, one or more USB port, AC power, and rechargeable features, the battery itself being rechargeable via solar energy for a hand held lock recharging unit with and tracking options.

Therefore, a general object of this invention is to provide a lock portable charging apparatus that selectively locks a mobile electronics charging device to a support structure.

Another object of this invention is to provide a lock portable charging apparatus, as aforesaid, that includes a battery charging device, global position device, and phone finding device in a functional padlock housing.

Still another object of this invention is to provide a lock portable charging apparatus, as aforesaid, having a solar cell for supplying current to an internal rechargeable battery.

Yet another object of this invention is to provide a lock portable charging apparatus, as aforesaid, in data communication with a mobile software application running on an associated smart device.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 4b is a sectional view taken along line 4b-4b of FIG. 4a;

DESCRIPTION OF THE PREFERRED EMBODIMENT

Figure 1:
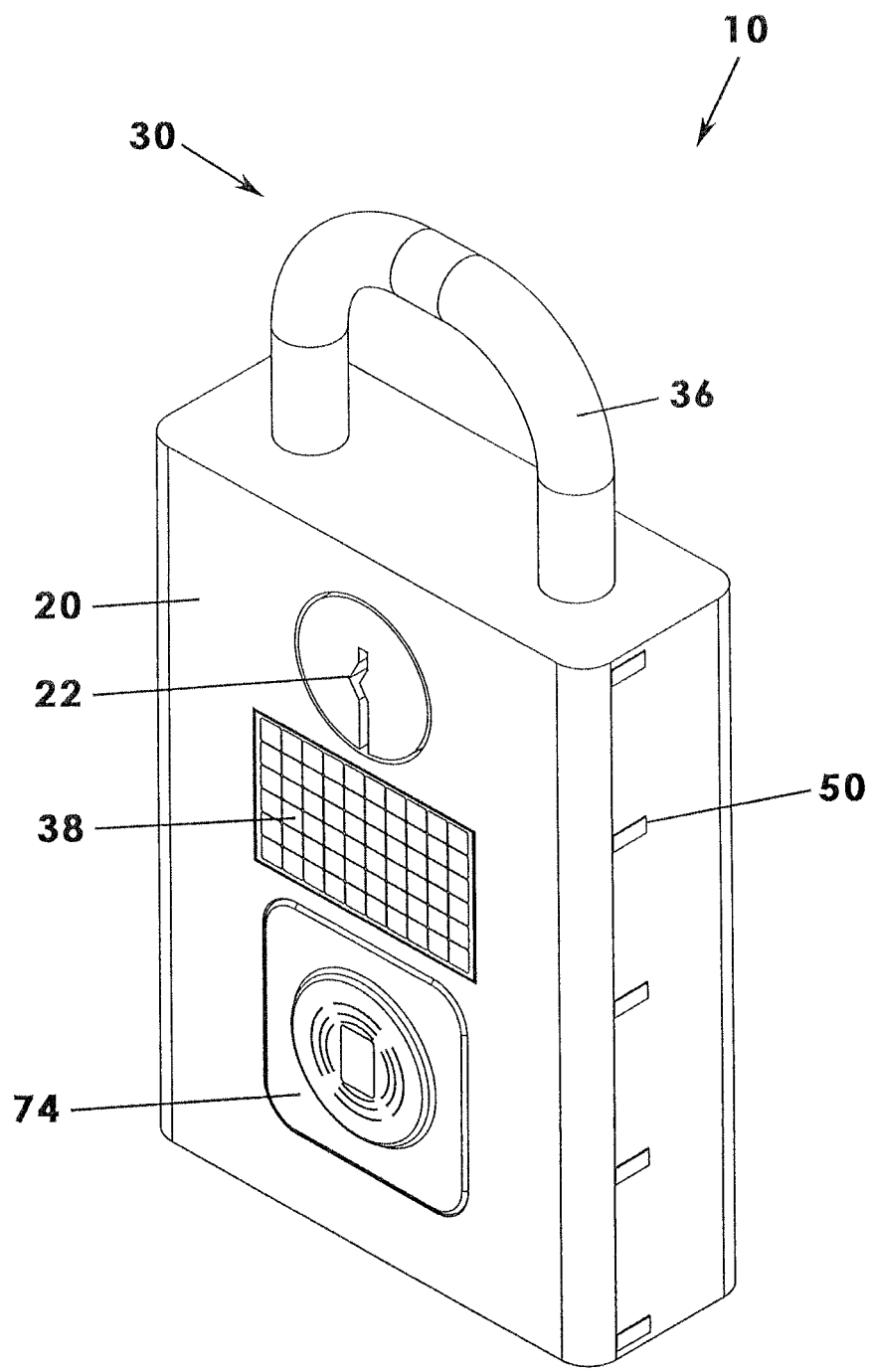
FIG. 1 is a perspective view of a lock charging apparatus according to a preferred embodiment of the present invention.
Figure 2A:
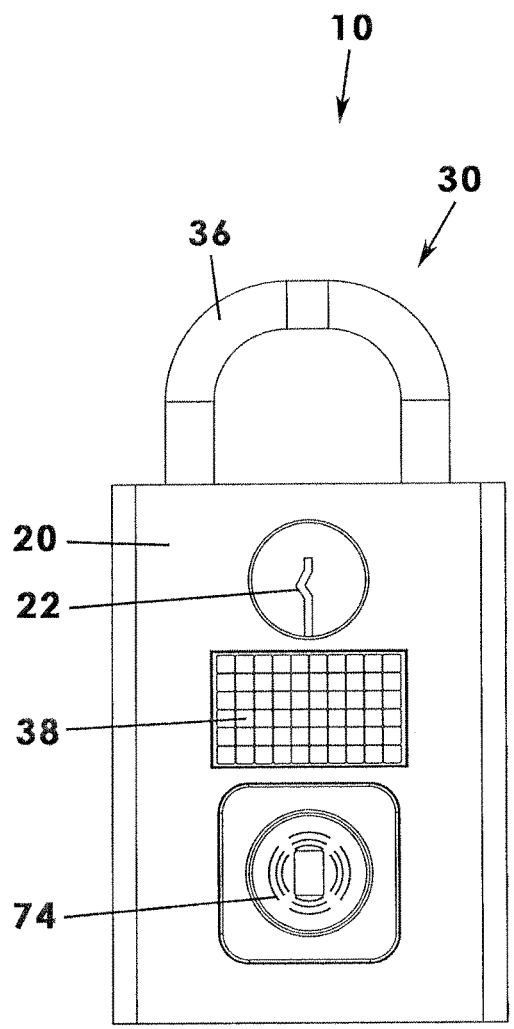
FIG. 2a is a front view of the lock charging apparatus as in FIG. 1 illustrated in a locked configuration.
Figure 2B:
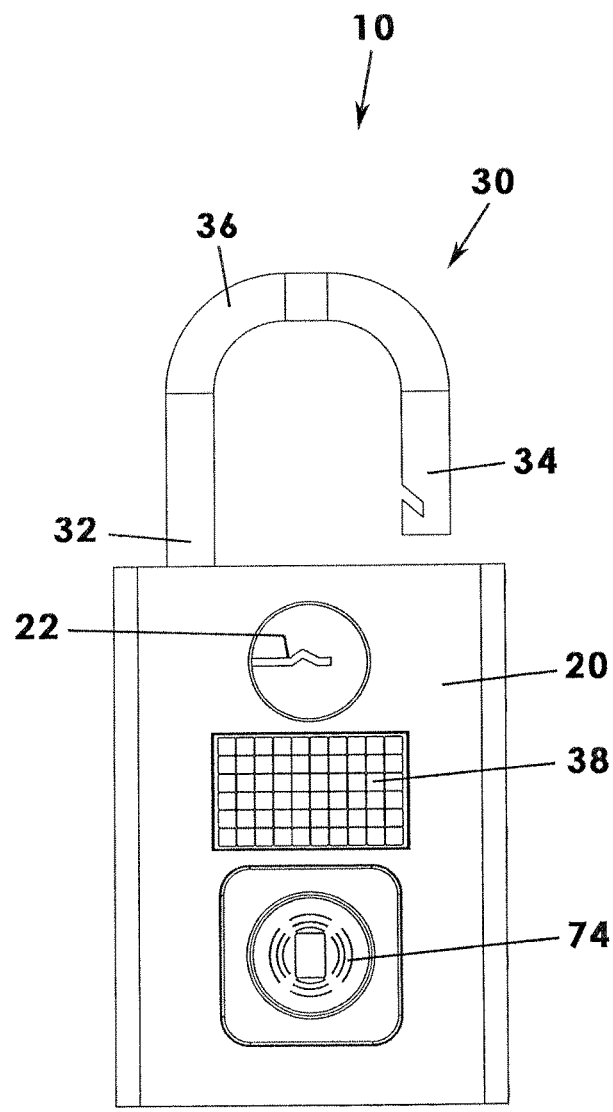
FIG. 2b is a front view of the lock charging apparatus as in FIG. 1 illustrated in an unlocked configuration.
Figure 3:
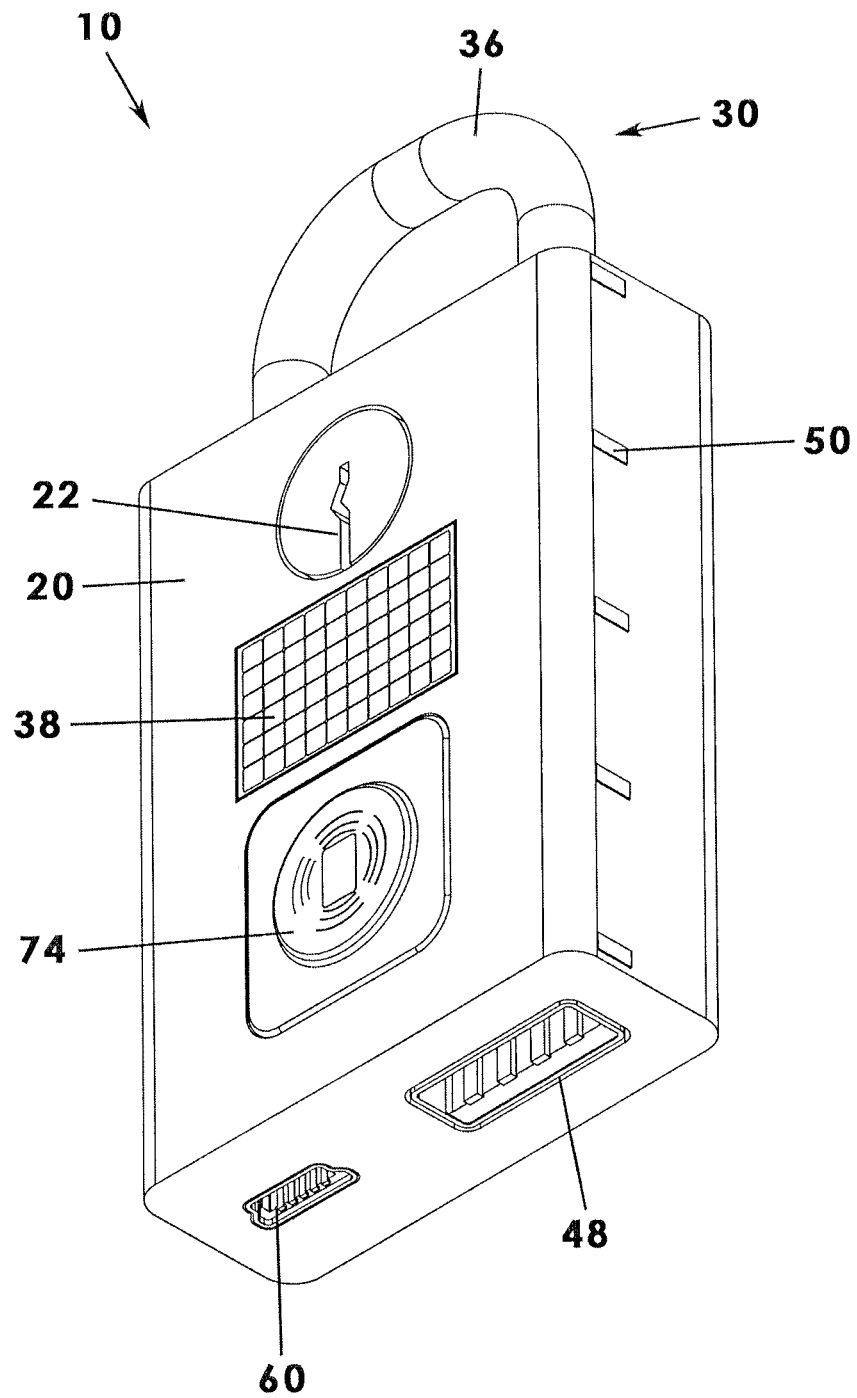
FIG. 3 is a perspective view from a lower angle of the lock charging apparatus as in FIG. 1.
Figure 4A:
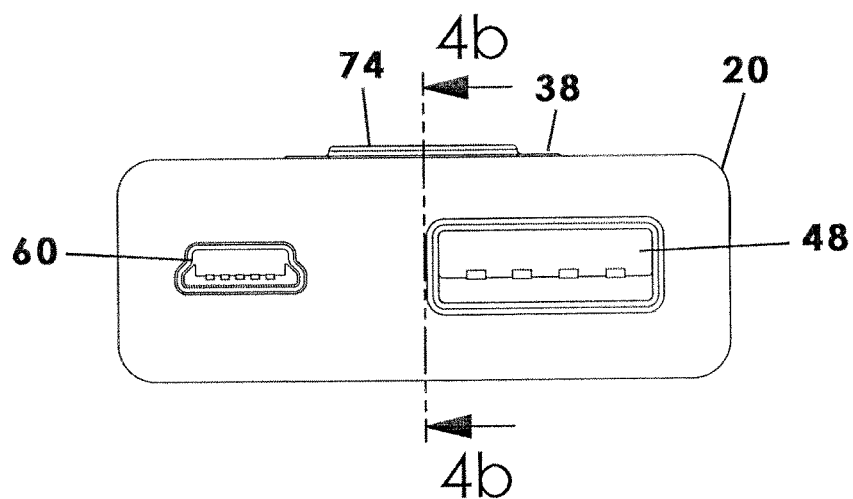
FIG. 4a is a bottom view of the lock charging apparatus as in FIG. 1.
Figure 4B:
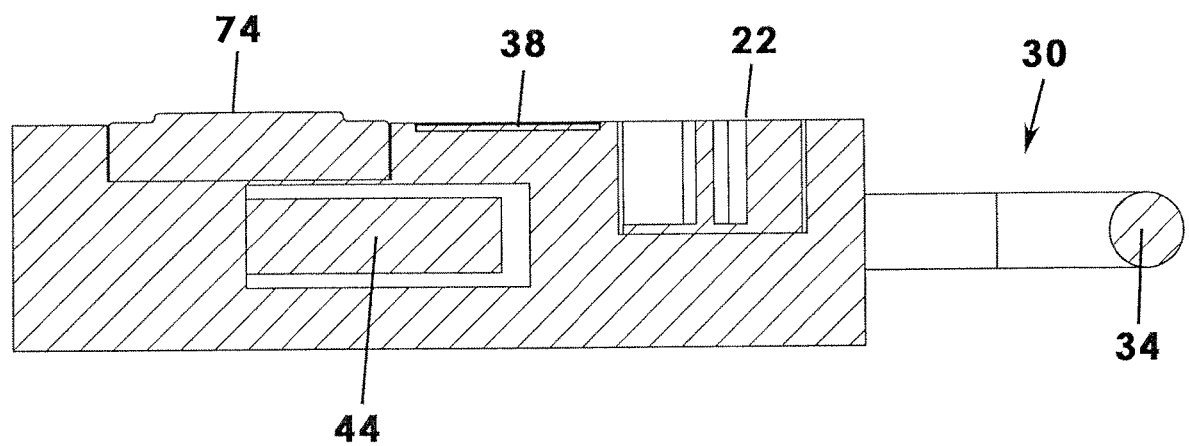
Figure 5:
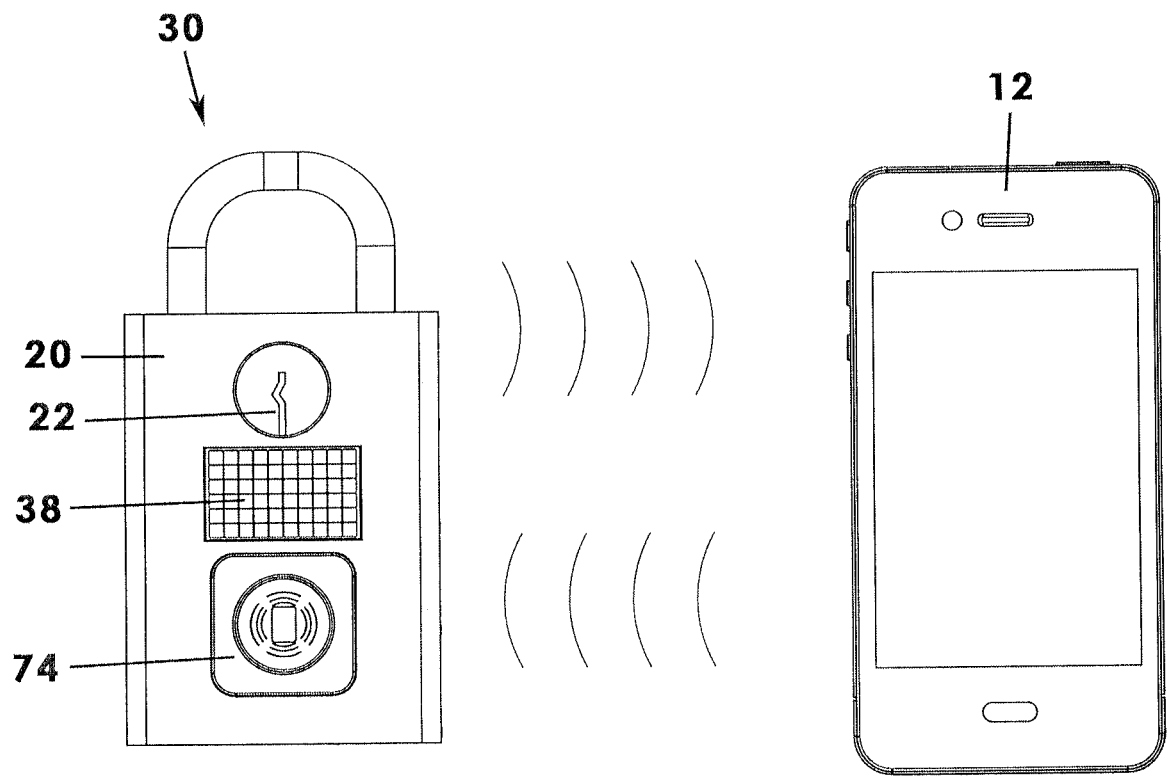
FIG. 5 is a diagrammatic view of the lock portable charge in use with a mobile electronic device.
Figure 6:
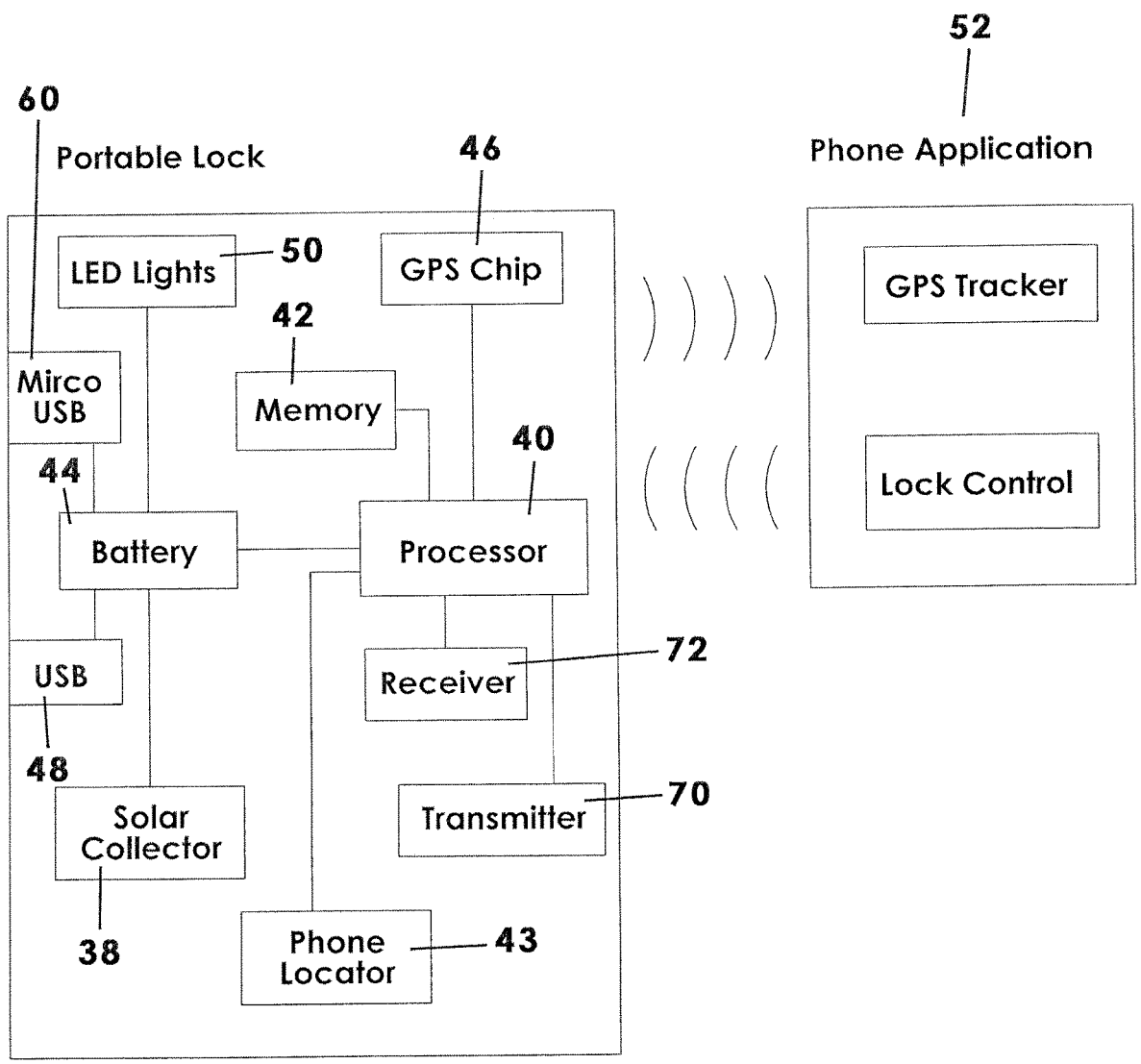
FIG. 6 is a block diagram illustrating the electronic components of the present invention.

A lock charging apparatus according to a preferred embodiment of the present invention will now be described in detail with reference to FIGS. 1 to 6 of the accompanying drawings. The cable charging apparatus 10 includes a case 20, a locking mechanism situated in the case 20 including a shackle assembly 30 in operative communication with the locking mechanism and movable between a locked configuration and unlocked configuration via receipt of an associated key. Further, a processor 40, memory 42, and battery 44 are situated in the case 20. In addition, a global position module 46, solar collector 38, and phone locator module 43 are situated in the case 20 and in electrical communication with the processor 40. A software product—preferably a mobile software application—may also be included and is configured to enable a mobile phone to locate the case 20 if lost and, conversely, to locate an associated cell phone if the phone is lost.

The lock charging apparatus 10 is both a device configured to charge a user's electronic devices and a locking device that prevents the charging device from being stolen.

For instance, the lock charging apparatus 10 may be used to charge the internal batteries of a cell phone, tablet, laptop computer, music player, or the like while being locked to a structure where it cannot be stolen.

A padlock is a detachable lock that hangs by a pivoted hook from the object to which it is fastened. The pivoted hook may be a so-called shackle assembly. First, the lock charging apparatus 10 includes a case 10 having a shape configuration that looks like a traditional padlock but includes many unexpected electronic components and functionality not expected to be associated with a padlock. More particularly, the lock charging apparatus 10 includes a case 20 having a plurality of walls arranged in a way that resembles a traditional padlock, such as including front and back panels having a square configuration and then connecting panels that, collectively, define an open interior area.

Then, elements of a locking mechanism as well as electronic components are situated inside the interior area of the case 20. More particularly, the locking mechanism may include a tumbler or the like that is configured to lock or unlock a shackle assembly 30 when actuated by an associated key inserted into a key slot 22. More particularly, the shackle assembly 30 comprises locking components having a shackle heel 32 in communication with the locking mechanism and which is movable into or out of the locking mechanism between locked and unlocked configurations. Further, the shackle assembly 30 includes a shackle body 36 connected to the shackle heel and extending upwardly or away from a top wall of the case and, therefore, is positioned outside of the interior area of the case 20. The shackle body 36 has an inverted U-shape (FIG. 1). Still further, the shackle assembly 30 includes a shackle toe 34 connected to the shackle body 36 and is situated inside the interior area of the case 20. The shackle toe 34 is situated inside the case 20 when the shackle heel 32 is in locked configuration and is situated substantially outside (i.e. "above") the case when the shackle heel 32 is unlocked.

It is understood that when the shackle assembly is "unlocked," the shackle heel 32 is raised upwardly which correspondingly raises the shackle body 36 and shackle toe 34.

Preferably, the shackle toe 34 has a truncated length, i.e. is shorter than the shackle heel 32 so that the terminal end of the shackle toe 34 is raised above the top wall of the case 20 (FIG. 2b) and may then be coupled to a support structure as will be described further later. Then, when the shackle toe 34 is pressed downwardly, it is received into the case 20 and locked into the locking mechanism, thus securing the case 20 to the support structure until again unlocked with the associated key being inserted into the key slot 22.

Various electronic components unique to the present invention are also situated in the interior area of the case 20 and provide the functionality as described below. It is understood that the electronic components may be hard-wired together, may be integrated on a circuit board, or may be wireless. First, a battery 44 is situated in the interior area of the case 20. The battery 44 may be accessed to charge a battery of a connected electronic device or may itself be rechargeable as described below or, in an embodiment, may be replaced as needed. More particularly, a USB port (also referred to as a primary USB port) is situated on one wall of the case 20, such as on the bottom wall, and that is in electrical communication with the battery 44. In other words, the battery 44 situated in the case 20 may receive alternating current (i.e. AC power) so as to be recharged or simply to power related electronic components that will be described later. A plurality of light emitting diodes (referred to as LEDs 50) may be arranged on a wall of the case 20 and electrically connected to the battery 44, the LEDs being energized in a manner that is indicative of how much current is available in the battery 44, i.e. how much "charge" the battery has left.

In addition, an auxiliary USB port 48 is situated on one wall of the case 20, such as on the bottom wall adjacent the primary USB port 60 and that includes a dimension and plug connector suitable for receiving a USB cable of a separate electronic device. The auxiliary USB port 48 is in electrical communication with the battery 44 of the lock charging apparatus 10. For instance, a respective battery of a cell phone, tablet, laptop computer, music player, electronic book reader, or the like may be recharged by accessing the battery 44 of the lock charging apparatus 10 via an associated USB cable (not shown) plugged into the auxiliary USB port 48.

In addition to the battery 44, current may be collected via a solar cell 38. More particularly, a solar cell 38 may be mounted to a wall of the plurality of walls of the case 20. The solar cell 38 is configured to receive solar energy from the sun as well as light energy from electrically powered lights, to convert collected energy into electrical current, and to supply converted energy to the battery 44.

The lock charging apparatus 10 may be considered a "smart" device. Specifically, a processor 40 is situated in the interior area of the case 20 and is in data communication with a non-volatile memory 42, the memory 42 having a plurality of data structures, including memory locations, for storing data and programming instructions. The processor 40 is electrically connected to the battery 44 for selectively energizing each electronic component connected to the processor 40.

In another aspect of the invention, the lock charging apparatus 10 includes a global position satellite (GPS) module 46 situated in the interior area of the case 20 and in data communication with the processor 40. The GPS module 46 is capable and configured to use the network of global position satellites (GPS network) to determine a GPS position of the module itself and, as a result, of the lock charging apparatus 10. This is helpful if the case 20 becomes lost, misplaced, or otherwise out of a user's possession and when the user is utilizing a mobile application 52 (i.e. a software product) installed on his cell phone. The mobile application 52 includes software (i.e. programming instructions) capable of communicating with the processor 40 and GPS module 46 to determine the global position of the GPS module 46 and to display this location information as a map or direction indicator on the associated cell phone 12. It is understood that the mobile application 52 would be executed by the processor or controller of the cell phone itself. Further, the cell phone 12 may transmit cellular signals and these signals are identified in the drawings. The case 20, therefore, may include both a transmitter 70 for transmitting requests for the remote cell phone to indicate its position and receiver 72 for receiving requests to identify its position. To summarize, the GPS module 46 in cooperation with the mobile application 52 enables a user to locate a lost lock charging apparatus 10.

Conversely, the lock charging apparatus 10 includes a phone locator module 43 positioned in the interior area of the case 20, the phone locator module 43 being in data communication with the processor 40. There is programming stored in memory 42 that, when executed by the processor 40, causes the processor 40 to energize the transmitter 70 to signal an associated cellular telephone, i.e. a smart phone associated with the owner of the lock apparatus 10, and to receive a return signal that has GPS location data indicative of the phone's location or to cause the cell phone to emit a ringtone so as to be audibly located. It is understood that the lost cell phone is a "smart phone" having the capability to identify its own GPS location and to transmit that location data to the lock recharging apparatus 10. A phone locator button 74 may be included on the case 20 that is electrically connected to the processor 40 and that is configured initiate a cell phone locater process.

In use, the lock charging apparatus 10 may be electrically connected to an AC power source for the purpose of charging up its internal battery. While charging the battery 44, the entire lock charging apparatus 10 may be secured to a support structure by engaging the shackle assembly thereto as described above. The support structure may be a chain that is itself coupled to the support structure, or could be the leg of a chair or other piece of furniture, a kitchen fixture, or anything else to which the lock assembly may be coupled. If, however, the lock charging apparatus 10 becomes lost or even stolen, a mobile application running on a cell phone may be operated to send a signal requesting GPS location data of the lock charging apparatus 10. Specifically, the processor 40 of the lock charging apparatus 10 will communicate with the GPS module 46 to determine a real time global location identification and return this data to the cell phone so that a user may be informed of the position of the of the lock charging apparatus 10 and thereby be enabled to secure it. Similarly, the phone locator button 74 may be pressed, causing the processor 40 to actuate the transmitter to transmit signals to be received by the associated cell phone. The cell phone, being operated according to the mobile application may be actuated to sound a ringtone or may return a signal to the lock charging apparatus 10 where it may be received by a receiver 72.

It is understood that while certain forms of this invention have been illustrated and described, it is not limited thereto except insofar as such limitations are included in the following claims and allowable functional equivalents thereof.

What is claimed is:

1. A lock charging apparatus, comprising:
   a case having a plurality of walls that, together, form an enclosure having a shape indicative of a padlock, said enclosure defining an interior area;
   a locking mechanism situated in said interior area of said case and that includes a shackle assembly;
   a battery situated in said interior area of said case;
     a USB port in electrical communication with said battery and configured to receive and transfer AC power from an external power source to said battery;
     an auxiliary USB port in electrical communication with said battery and configured to transfer current from said battery to an electronic device connected to said auxiliary USB port;
     a processor situated in said interior area of said case and electrically connected to said battery;
     a non-volatile member electrically connected to said processor and including data structures and programming;
     a global positioning module situated in said interior area and in data communication with said processor and operable to generate position data indicative of a global position of said case;
     a software application stored on a computing device remote from said casing that, when executed, transmits to said processor a request for said position data indicative of a global position of said case;
     a phone locator module in data communication with said processor;
     programming in said memory that, when executed by said processor, causes said phone locator module to transmit a request for phone position data to a communications device remote from said casing and associated with said processor.

2. The lock charging apparatus as in claim 1, wherein said shackle assembly includes:
   a shackle heel in communication with said locking mechanism and selectively movable between locked and unlocked configurations;
   a shackle body connected to said shackle heel and extending outside of said interior area of said housing;
   a shackle toe connected to said shackle body and situated inside said case when said shackle heel is at said locked configuration and situated outside said case when said shackle heel as at said unlocked configuration.

3. The lock charging apparatus as in claim 2, wherein said case includes a key inlet in operative communication with said lock mechanism and a key having a configuration complementary to a configuration of said key inlet that, when received into said key inlet, causes said shackle heel to move to said unlocked configuration.

4. The lock charging apparatus as in claim 1, further comprising a solar cell positioned on an exterior wall of said case and in electrical communication with said battery, said solar cell being operable to collect solar energy, to convert said collected solar energy to electricity, and to electrically transfer said collected solar energy to said battery.

5. The lock charging apparatus as in claim 1, further comprising a plurality of indicator lights on said case and electrically connected to said battery, said plurality of indicator lights being operable to indicate a quantity of current available from said battery.

6. The lock charging apparatus as in claim 5, wherein said plurality of indicator lights is a plurality of light emitting diodes.

7. The lock charging apparatus as in claim 1, further comprising:
   a transmitter in data communications with said processor and operable to transmit said request for phone position data when actuated;
   a receiver in data communication with said processor and operable to receive said request for said position data indicative of a global position of said case.

8. A lock charging apparatus, comprising:
   a case having a plurality of walls that, together, form an enclosure defining an interior area;
   a locking mechanism situated in said interior area of said case and that includes a shackle assembly;
   a battery situated in said interior area of said case;
     a USB port in electrical communication with said battery and configured to receive and transfer AC power from an external power source to said battery;
     an auxiliary USB port in electrical communication with said battery and configured to transfer current from said battery to an electronic device connected to said auxiliary USB port;
     a processor situated in said interior area of said case and electrically connected to said battery;
     a non-volatile memory electrically connected to said processor and including data structures and programming;

a global positioning module situated in said interior area and in data communication with said processor and operable to generate position data indicative of a global position of said case;

a software application stored on a computing device remote from said casing that, when executed, transmits to said processor a request for said position data indicative of a global position of said case;

a phone locator module in data communication with said processor; and programming in said memory that, when executed by said processor, causes said phone locator module to transmit a request for phone position data to a communications device remote from said casing and associated with said processor.

9. The lock charging apparatus as in claim 8, wherein said shackle assembly includes:

a shackle heel in communication with said locking mechanism and selectively movable between locked and unlocked configurations;

a shackle body connected to said shackle heel and extending outside of said interior area of said housing;

a shackle toe connected to said shackle body and situated inside said case when said shackle heel is at said locked configuration and situated outside said case when said shackle heel as at said unlocked configuration.

10. The lock charging apparatus as in claim 9, wherein said case includes a key inlet in operative communication with said lock mechanism and a key having a configuration complementary to a configuration of said key inlet that, when received into said key inlet, causes said shackle heel to move to said unlocked configuration.

11. The lock charging apparatus as in claim 8, further comprising:

a transmitter in data communications with said processor and operable to transmit said request for phone position data when actuated;

a receiver in data communication with said processor and operable to receive said request for said position data indicative of a global position of said case.

12. The lock charging apparatus as in claim 8, further comprising a plurality of indicator lights on said case and electrically connected to said battery, said plurality of indicator lights being operable to indicate a quantity of current available from said battery.

13. The lock charging apparatus as in claim 12, wherein said plurality of indicator lights is a plurality of light emitting diodes.

14. The lock charging apparatus as in claim 8, wherein said plurality of walls of said case has a shape indicative of a padlock.

15. A lock charging apparatus, comprising:

a case having a plurality of walls that, together, form an enclosure having a shape indicative of a padlock, said enclosure defining an interior area;

a locking mechanism situated in said interior area of said case and that includes a shackle assembly;

a battery situated in said interior area of said case;

a USB port in electrical communication with said battery and configured to receive and transfer AC power from an external power source to said battery;

an auxiliary USB port in electrical communication with said battery and configured to transfer current from said battery to an electronic device connected to said auxiliary USB port;

a processor situated in said interior area of said case and electrically connected to said battery;

a non-volatile member electrically connected to said processor and including data structures and programming;

a phone locator module in data communication with said processor;

programming in said memory that, when executed by said processor, causes said phone locator module to transmit a request for phone position data to a communications device remote from said casing and associated with said processor.

16. The lock charging apparatus as in claim 15, further comprising:

a global positioning module situated in said interior area and in data communication with said processor and operable to generate position data indicative of a global position of said case; and a software application stored on a computing device remote from said casing that, when executed, transmits to said processor a request for said position data indicative of a global position of said case.

17. The lock charging apparatus as in claim 16, further comprising a plurality of indicator lights on said case and electrically connected to said battery, said plurality of indicator lights being operable to indicate a quantity of current available from said battery.

18. The lock charging apparatus as in claim 17, further comprising:

a transmitter in data communications with said processor and operable to transmit said request for phone position data when actuated; and a receiver in data communication with said processor and operable to receive said request for said position data indicative of a global position of said case.

* * * * *